(12) United States Patent  (10) Patent No.: US 9,153,133 B1
Lunsford  (45) Date of Patent: Oct. 6, 2015

(54) MOTORCYCLE BLIND SPOT DETECTOR

(71) Applicant: John D. Baker, Washington, DC (US)

(72) Inventor: Kyle Steven Lunsford, Elon, NC (US)

(73) Assignee: John D. Baker, Washington, DC (US)

( * ) Notice: Subject to any disclaimer, the term of this patent is extended or adjusted under 35 U.S.C. 154(b) by 0 days.

(21) Appl. No.: 14/334,987

(22) Filed: Jul. 18, 2014

(51) Int. Cl.
*G08G 1/00* (2006.01)
*G08G 1/16* (2006.01)
*B62J 6/00* (2006.01)
*B62J 99/00* (2009.01)

(52) U.S. Cl.
CPC . *G08G 1/167* (2013.01); *B62J 6/00* (2013.01); *B62J 99/00* (2013.01); *B62J 2099/002* (2013.01); *B62J 2099/0013* (2013.01)

(58) Field of Classification Search
CPC ............... B62J 99/00; B62J 2099/0013; B62J 2099/002

USPC ............. 340/539.1, 539.11, 539.13, 506, 3.1, 340/427, 429, 426.24
See application file for complete search history.

(56) References Cited

U.S. PATENT DOCUMENTS

| 4,694,295 | A | 9/1987 | Miller et al. |
| 8,564,425 | B2 | 10/2013 | Al-Jafar |
| 8,645,001 | B2 | 2/2014 | Basson et al. |
| 2005/0195383 | A1* | 9/2005 | Breed et al. ............... 356/4.01 |
| 2013/0155533 | A1 | 6/2013 | Hunter |
| 2014/0185311 | A1* | 7/2014 | Sharghi ..................... 362/520 |

* cited by examiner

*Primary Examiner* — Daryl Pope

(74) *Attorney, Agent, or Firm* — James G. Passé; Passé Intellectual Property, LLC

(57) ABSTRACT

The present invention relates to an electronic device for monitoring the blind spot of a motorcycle driver. The device includes a lean detector to incorporate lean into the position of the motorcycle driver.

12 Claims, 2 Drawing Sheets

MOTORCYCLE BLIND SPOT DETECTOR

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to blind spot detection in a vehicle. In particular, it relates to blind spot detection specifically for a motorcycle.

2. Description of Related Art

One of the major reasons for motor vehicle accidents are blind spots in the perspective of a driver of the vehicle. The driver blind spot occurs when a second vehicle is in an accompanying lane and is not visible in the rear view mirror or difficult to see because of its location relative to the view of the driver. Blind spot accidents will happen when a driver switches lanes and is not aware of the second vehicle's position relative to the vehicle. When that happens, a collision between the two vehicles occurs. A series of mirrors is typically used to help, but no matter what the vehicle—be it a sedan, van, truck or a motorcycle—there is difficulty in seeing vehicles in the adjoining lanes. The problem is especially dangerous for motorcycles seeing that a collision between a motorcycle and any other vehicle almost guarantees injury to the motorcycle driver.

There are currently several devices available for standard 4 or more wheeled motor vehicles, from radar to infrared, which basically assume where the blind spot is on a particular vehicle. These devices are based on the driver being positioned to the left or to the right side of the vehicle and can detect objects in that particular spot, notifying the driver to be aware. These devices work since the vehicle in normal operation stays relatively level and the second vehicle is in a predictable place. Motorcycles have a separate problem. First, the driver is positioned in the center of the vehicle and second, the blind spot is relatively different than it is for a car. Motorcycles while turning lean left and right relative to the ground and forward movement, which changes the relative position of vehicles in adjoining lanes, even though the motorcycle remains relatively in the same position in the lane. Currently, there is not a blind spot system detection device which addresses this issue.

BRIEF SUMMARY OF THE INVENTION

The present invention relates to the discovery that if a standard object detection system is combined with an electronic lean indicator, then the combination of information from the two devices can give a more accurate picture of the position of another vehicle in a first vehicle's blind spot.

Accordingly, the invention relates to, in one embodiment, a blind spot monitoring system for a two-wheeled motorcycle driven by a user with the motorcycle traveling on a road lane with a user thereon comprising:

a) a pair of object detectors mounted one on each of a left and right side of the motorcycle;

b) a lean detector associated with each of the object detectors;

c) a processor for associating the signal from the object detectors and the lean detector and determining the relative position of a vehicle in a road lane next to the vehicle and based on the lean of the motorcycle; the processor having parameters for where the blind spot is relative to the user; and d) a reporting device for reporting to the user driving the motorcycle when the processor has determined there is a vehicle in the user's blind spot or would otherwise be hit if the user is about to change the lane the user is in.

DETAILED DESCRIPTION OF THE INVENTION

Figure 1:
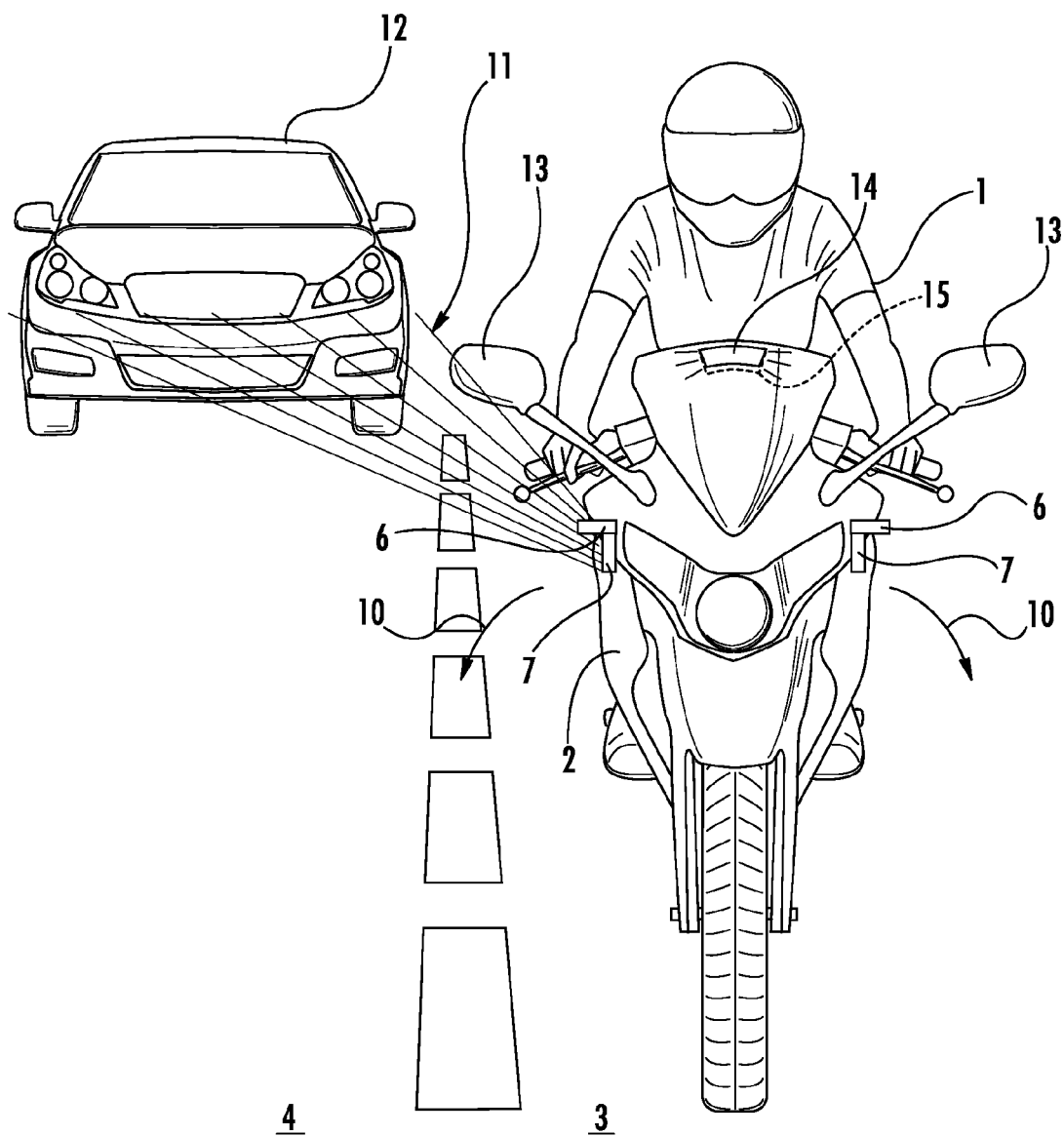
FIG. 1 is a drawing of the system of the present invention on a motorcycle in traffic.

While this invention is susceptible to embodiment in many different forms, there is shown in the drawings, and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term "comprising" could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, (i.e., one or more methods, devices, or apparatuses for achieving the desired function) and that one skilled in the art could select from these or their equivalent in view of the disclosure herein and use of the term "means" is not intended to be limiting.

As used herein the term "blind spot monitoring system" refers to a system which notifies a driver, in this case a driver of a motorcycle, of a vehicle in the blind spot of the driver. The determination of a motorcycle driver's blind spot is the determination of a spot which the driver cannot see or has difficulty seeing in an adjoining lane, and the subsequent warning of the presence of a vehicle in such a spot to prevent an accident. The determination of the blind spot for a motorcycle driver does not only depend on the relative positions of the vehicles and the position of the driver; it also depends on the amount of lean the motorcycle is experiencing. The present system accounts for changes relative to a vehicle in the next lane. The present system also includes determination of the lean of the motorcycle for proper determination of the blind spot. The device can be on at any time the motorcycle is on, be turned on when the user turns on a turn signal, be activated based on lean angles, or be turned on manually.

As used herein the term "motorcycle" refers to an open air vehicle wherein the driver sits in the middle of the vehicle and wherein the vehicle is leaned during turns. While in most cases it refers to a two wheeled vehicle, it can also include those that are 3 or even 4 wheeled open air vehicles that lean left or right during the turning process.

As used herein the term "road lane" refers to the marked lanes on a roadway indicating where a motor vehicle should travel. It also assumes that a second lane is next to the driver on the left or right where a vehicle could be traveling in the motorcycle driver's blind spot.

As used herein the term "object detector" refers to any kind of electronic device that has the ability to detect the presence of an object (i.e. a vehicle in the driver's blind spot) in the lane next to the lane the motorcycle driver is operating the vehicle in. Many systems are well-known, and such detection methods such as radar, infrared, ultrasonic, and the like are within the skill in the art. These systems by themselves do not include the factoring in of the lean of the motorcycle. Since there may be a lane on either side of the motorcycle (e.g. 3 lanes in each direction) there will be an object detector on the left and the right of the motorcycle. The object detector can be positioned anywhere on the motorcycle where it can get the appropriate reading; for example, on the left and right rear view mirrors or on the left and right body of the motorcycle.

As used herein, the term "lean detector" is meant to be a device that measures the degrees off of upright (0 degrees) that the motorcycle is leaning during use or is simply a device able to detect a change in the motorcycle orientation from the upright riding position. Motorcycles can lean 45 degrees or more. In motorcycle terms, a lean detector determines any yaw, pitch, or roll. Devices are well known to detect the lean of the motorcycle. There can be just one lean detector, but 2 or more could be utilized.

As used herein the term "associated" refers to the lean detector and the object detector being combined via a "processor" (a computer chip, computer or other digital processing circuit) which calculates the position of the driver's head/eyes based on the lean of the motorcycle and thus calculates where the blind spot is. It then uses that information to determine if there is a vehicle traveling in the road lane in the driver's left or right blind spot based on the combination of information between the two devices.

As used herein the term "reporting device" is a device that reports the information from the processor to the driver that there is a vehicle in the driver's blind spot which would be hit if the user lane changes at that moment. The device can be a simple light that lights up or be more detailed, reporting a percent in the blind spot, distance to the vehicle, if the vehicle is on the left, right or the like, and be a series of lights, visual displays and the like. In one embodiment, the reporting device could give a "heads up" display on the motorcycle user's see-through face plate.

Now referring to the drawings, FIG. 1 is a drawing of the system of the present invention on a motorcycle in traffic. Here, motorcycle driver 1 is sitting on motorcycle 2, which is driving along in road lane 3 next to adjacent road lane 4. Arrows 10 indicate the direction the motorcycle can lean while driving. The motorcycle 2 is outfitted with the system object detectors 6 positioned on the left and right side of the motorcycle 2. The lean detectors 7 (in this example two) are positioned next to the object detectors 6 but can be positioned anywhere as long as they are associated with the object detectors. In one embodiment, there is only one lean detector 7. The object detector 6 sends out detection signals 11 to detect auto 12 in lane 4. In one embodiment, either the object detector 6 or the lean detector 7 could be located on the rear view mirror 13.

The combined information from the object detector 6 and lean detector 7 is sent to a processor 14 which in this case is housed in reporting device 15 since processors are fragile and typically in a housing unit. In one embodiment the processor is separate from the reporting device and can be located anywhere. The reporting device 15 is in front of the driver 1 and is a full visual display, though smaller devices as noted above which could be utilized.

In using the system, the lean detector 7 determines the lean of the vehicle and then, utilizing object detector 6, sends out electronic wave detection signal 11 and detects vehicle 12. Then the system reports the result to the display panel after the processor has compensated for the lean of the vehicle 2 and user 1.

Figure 2:
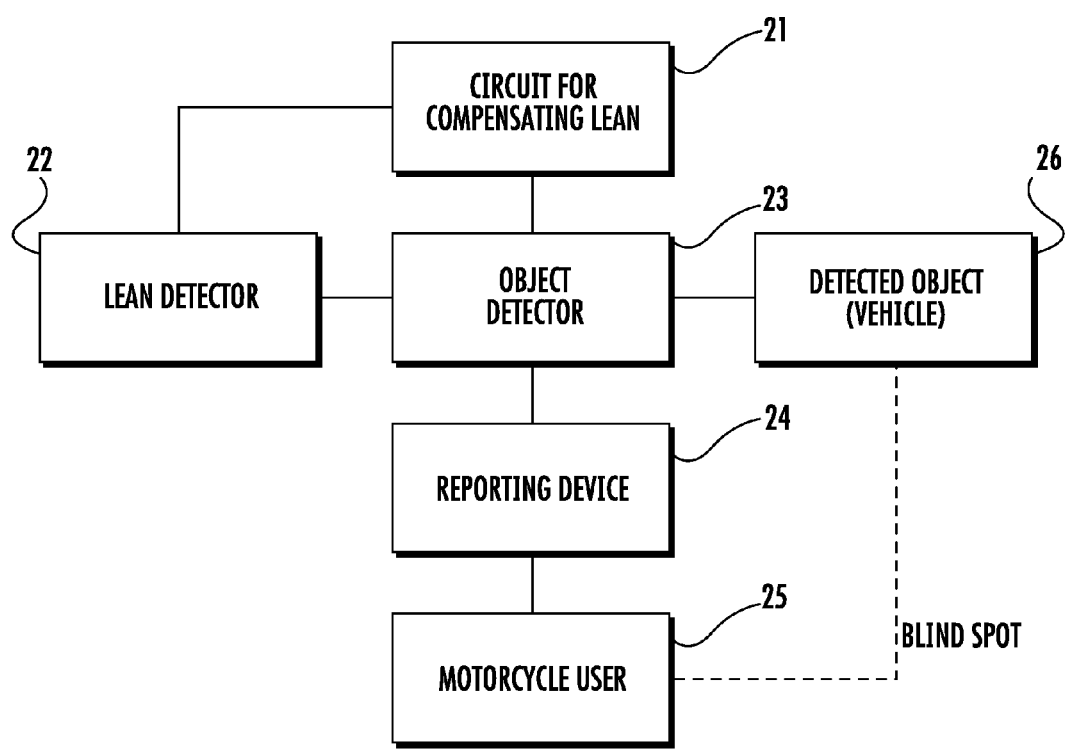
FIG. 2 is a schematic drawing of the parts of the present system.

FIG. 2 is a relationship drawing of the parts of the present system. In this view the object detector 23 is associated with the lean detector 22. A circuit in a processor chip 21 or the like uses the information from the lean detector 22 and object detector 23 to position an object (vehicle) relative to the motorcycle user 25. The system then sends the information of the existence of a vehicle in the blind spot via a reporting device 24 as described above thus allowing the motorcycle user 25 to decide if he can make a lane change or not without hitting the detected vehicle 26.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the Applicant.

What is claimed is:

1. A blind spot monitoring system for a two wheeled motorcycle driven by a user, the motorcycle traveling on a road lane with a user thereon comprising:
    a) a pair of object detectors mounted one on each of a left and right side of the motorcycle;
    b) a lean detector associated with each of the object detectors;
    c) a processor for associating the signal from the object detectors and the lean detectors and determining the relative position of a vehicle in a road lane next to the vehicle based on the lean of the motorcycle; the processor having parameters for where the blind spot is located relative to the user; and
    d) a reporting device for reporting to the user of the motorcycle when the processor has determined there is a vehicle in the user's blind spot or would otherwise be hit if the user is about to change the lane the user is in.

2. The blind spot detector according to claim 1 wherein the detector is radar based system.

3. The blind spot detector according to claim 1 wherein the detector is an ultrasonic based system.

4. The blind spot detector according to claim 1 wherein the detector is an infrared-based system.

5. The blind spot detector according to claim 1 wherein the detector is a camera based system.

6. The blind spot detector according to claim 1 wherein the detectors are each mounted on a rear view mirror.

7. The blind spot detector according to claim 1 wherein the reporting device is an audio or visual alarm.

8. The blind spot detector according to claim 1 wherein the reporting device is visual display.

9. The blind spot detector according to claim 1 wherein the reporting device indicates which side of the motorcycle a vehicle has been detected on.

10. The blind spot detector according to claim 1 wherein the distance from the motorcycle to a detected vehicle is reported to the user.

11. The blind spot detector according to claim 1 wherein the system is activated when the user operates a turn signal of the vehicle.

12. The blind spot detector according to claim 1 wherein the system is activated by the motorcycle lean angle.

* * * * *